United States Patent [19]

Suenobu et al.

[11] 4,322,519

[45] Mar. 30, 1982

[54] METHOD OF PRODUCING POLYURETHANES

[75] Inventors: Koreyoshi Suenobu, Buzen; Masanori Kohara, Nakatsu; Kazuki Katsuyama; Ryoichi Kinishi, both of Nara, all of Japan

[73] Assignee: Yoshitomi Pharmaceutical Industries, Ltd., Osaka, Japan

[21] Appl. No.: 212,042

[22] Filed: Dec. 1, 1980

[30] Foreign Application Priority Data

Nov. 30, 1979 [JP] Japan ................................ 54-155845
Jun. 18, 1980 [JP] Japan ................................ 55-83317
Aug. 15, 1980 [JP] Japan ............................... 55-112794

[51] Int. Cl.$^3$ ...................... C08G 18/80; C08G 18/14; C08G 18/24; C07F 7/22
[52] U.S. Cl. ................................. 528/45; 260/429.7; 521/126; 528/58
[58] Field of Search ................... 528/45, 58; 521/126; 260/429.7

[56] References Cited

U.S. PATENT DOCUMENTS

| | | | |
|---|---|---|---|
| 3,073,788 | 1/1963 | Hostettler et al. | 521/175 |
| 3,123,577 | 3/1964 | Heiss | 260/2.3 |
| 3,676,402 | 7/1972 | Matsui et al. | 528/45 |
| 4,018,744 | 4/1977 | Wolgemirth | 528/45 |
| 4,028,313 | 6/1977 | Mueller et al. | 528/45 |
| 4,101,486 | 7/1978 | Bosso et al. | 260/29.2 TN |
| 4,131,605 | 12/1978 | Ammons | 528/77 |
| 4,131,606 | 12/1978 | Ammons | 528/58 |
| 4,193,913 | 3/1980 | Abeler | 260/429.7 |

OTHER PUBLICATIONS

Anderson, Inorg. Chem., vol. 3, No. 6, 912–914, (1964).
Anderson, Anal. Chem., vol. 34, No. 10, 1340–1341, (1962).
Komura et al., Inorg. & Nuclear Chem. Letters, vol. 2, 93–95, (1966).
Chem. Abs. Formula Index, 1941–1950, 396F.
Chem. Abs. Formula Index, 1951–1955, 570F.
Iwamoto et al., Chem. Abs., vol. 74, 64498d, (1971).
Soderquist et al., Chem. Abs., vol. 89, 124376j, (1978).
Stapfer et al., Jour. Organometallic Chem., vol. 56, 175–183, (1973).
Stapfer et al., Chem. Abs., vol. 79, 105357f, (1973).
Chem. Abs. Formula Index, 1972–1976, 1033F.
Bulen, Chem. Abs., vol. 78, 97810K, (1973).
Davies et al., Jour. Organometallic Chem., vol. 39, 279–288, (1972).
Luijten, Rec. Trav. Chim. des Pays-Bas, vol. 85, 873–878, (1966).
Baum et al., Polymer Letters, vol. 1, 517–519, (1963).
Reichle, Jour. Polym. Sci., vol. XLIX, 521–532, (1961).
Sawyer, Organotin Compounds, vol. 1, Dekkei, New York, (1971), pp. 213–214.
Mizumura et al., Chem. Abs., vol. 90, 153568z; vol. 91, 41016g.
Fujiyoshi et al., Chem. Abs., vol. 87, 86467p.

Primary Examiner—H. S. Cockeram
Attorney, Agent, or Firm—Sughrue, Mion, Zinn, Macpeak and Seas

[57] ABSTRACT

The use of a catalytic amount of a specific monoorganotin compound, namely a monoalkyltin oxide, a monocarboxylate thereof, a monoalkyltin sulfide or monophenyltin oxide, in producing polyurethanes by reacting under heating an at least partially blocked polyisocyanate and an active hydrogen-containing compound significantly lowers the baking temperature and gives cured coatings with a smooth surface and good performance.

7 Claims, No Drawings

METHOD OF PRODUCING POLYURETHANES

BACKGROUND OF THE INVENTION

1. Field of the Invention

This invention relates to a method of producing polyurethanes, especially for coating purposes.

2. Description of the Prior Art

In the conventional processes for producing polyurethanes in the form of coatings using blocked or capped isocyanate compounds, baking at high temperatures, at about 200° C., for instance, is required. Therefore, in coating relatively thin steel sheets, there arise such problems as deformation of the steel sheets themselves, melting of solders and excessive energy consumption.

For solution of these problems, it is strongly desired to lower the deblocking temperatures of the blocked isocyanate compounds, and so far there have been proposed as catalysts for lowering the deblocking temperatures 1,1,3,3-tetrabutyl-1,3-diacetoxydistannoxane, 1,1,3,3-tetrabutyl-1,3-diphenoxydistannoxane, 1,1,3,3-tetrabutyl-1,3-dibenzyloxydistannoxane, dibutyltin oxide, dibutyltin dilaurate and tetrabutyltin, for instance, (see, for example, Japanese Patent Publication No. 18877/1969, Japanese Patent Applications laid open (Kokai) under Nos. 42528/1977, 138434/1978 and 138435/1978, and U.S. Pat. No. 4,101,486). However, the effects of these compounds are still unsatisfactory. More efficient catalysts are demanded.

SUMMARY OF THE INVENTION

As a result of intensive research by the present inventors, it has now been found that certain monoorganotin compounds are highly effective as catalysts for deblocking capped isocyanate compounds. The monoorganotin compounds are mono-$C_{1-8}$-alkyltin oxides, mono-$C_{1-8}$-alkyltin monocarboxylates, mono-$C_{1-8}$-alkyltin sulfides and monophenyltin oxide.

DETAILED DESCRIPTION OF THE INVENTION

Thus, the invention provides a method of producing polyurethanes by reacting under heating an at least partially blocked isocyanate compound with an active hydrogen-containing compound, which method is characterized by the use of at least one of the monoorganotin compounds mentioned above. The monoorganotin compounds may also be used in combination with the conventional organotin catalysts known in the art.

The blocked isocyanate compound to be used in the practice of the invention includes perfectly blocked polyisocyanate compounds and half-blocked or partially blocked polyisocyanate compounds. They are the adducts of polyisocyanate compounds with blocking agents in theoretically calculated weight ratios. Examples of the polyisocyanate compounds, which may be of the aromatic, alicyclic or aliphatic series, are tolylene diisocyanate, xylylene diisocyanate, phenylene diisocyanate, bis(isocyanatomethyl)cyclohexane and tetramethylene diisocyanate, and terminal isocyanato group-containing compounds obtained by reacting an excess of any of such polyisocyanate with an active hydrogen-containing low molecular weight compound such as ethylene glycol, propylene glycol, trimethylolpropane, hexanetriol or castor oil.

The blocking agents are, for example, phenols (e.g. phenol, cresol, xylenol, thiophenol), alcohols (e.g. methanol, ethanol, butanol, 2-ethylhexanol, cyclohexanol, 2-methoxyethanol, 2-ethoxyethanol), and other active hydrogen-containing compounds such as ethyl acetoacetate and diethyl malonate.

Examples of the active hydrogen-containing compound another basic starting material for producing polyurethanes, are polyether polyols, polyester polyols, polyurethane polyols, epoxy group-containing polyols, amine modified epoxy resins (amine adducts of epoxy resins) and polyamide resins.

The blocked isocyanate compound and the active hydrogen-containing compound may be one and the same compound, such as a reaction product of a half-blocked diisocyanate and an amine modified epoxy resin. Such a reaction product is especially useful in electrodeposition of coatings.

The mono-$C_{1-8}$-alkyltin oxides, which are also called alkylhydroxyoxostannanes or alkanestannoic acids and may be in polymeric form, are, for example, monomethyltin oxide, monoethyltin oxide, monopropyltin oxide, monobutyltin oxide and monooctyltin oxide.

The mono-$C_{1-8}$-alkyltin monocarboxylates are salts of the above-mentioned monoalkyltin oxides with carboxylic acids in a ratio of one mole to one equivalent. When the carboxylic acids are monobasic carboxylic acids, the mono-$C_{1-8}$-alkyltin monocarboxylates may be represented by the general formula

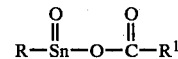

wherein R is a $C_{1-8}$ alkyl and $R^1$ is H or a $C_{1-17}$ hydrocarbon residue. Examples of the carboxylic acids are alkanoic acids (e.g. formic, acetic, propionic, butyric, isobutyric, valeric, isovaleric, caproic, 2-ethylhexanoic, lauric, stearic acid), dibasic carboxylic acids (e.g. maleic, phthalic acid) and monoesters of such dibasic carboxylic acids. Monobutyltin monocarboxylates, for instance, can be prepared e.g. by reacting one mole of monobutyltin trichloride with 2 moles of an aqueous caustic alkali and then adding dropwise an aqueous solution of one mole of sodium salt of a carboxylic acid, or by heating under reflux one mole of monobutyltin oxide and one mole of a dibasic acid monoalkyl ester in an organic solvent, while removing the resulting water. (See Reference Examples 1 and 2.)

The mono-$C_{1-8}$-alkyltin sulfides include monomethyltin sulfide, monoethyltin sulfide, monopropyltin sulfide, monobutyltin sulfide and monooctyltin sulfide. Generally, they can easily be prepared by reacting one mole of a monoalkyltin trihalide with 1.5 moles of sodium sulfide or ammonium sulfide. (See Reference Example 3.)

The monoorganotin compounds mentioned above may be used alone or in combination.

The conventional organotin compounds which can be used in combination with the monoorganotin compounds mentioned above include 1,1,3,3-tetrabutyl-1,3-diacetoxydistannoxane, 1,1,3,3-tetrabutyl-1,3-diphenoxydistannoxane, 1,1,3,3-tetrabutyl-1,3-dibenzyloxydistannoxane, dibutyltin oxide, dibutyltin dilaurate and diphenyltin oxide. The monoorganotin compounds should preferably account for 10% or more in each combination.

The monoorganotin compounds, optionally in combination with the conventional organotin compounds, are used as catalysts in blocked polyisocyanate compositions, such as powder coating compositions and cathodically electrodepositable coating compositions. Thus, for example, any of the monoorganotin compounds is melt-blended at 110°–130° C. with constituents of a powder coating composition, and the mixture is cooled and micropulverized to give a powder coating composition. In the case of a cathodically electrodepositable coating composition, a reaction product of a half-blocked diisocyanate compound and an amine modified epoxy resin (active hydrogen-containing compound, which may further be modified e.g. with dehydrated castor oil-derived fatty acids) is quaternized with an organic acid (e.g. acetic acid) for solubilization, and the resulting composition is mixed with a monoorganotin compound and other necessary constituents (e.g. pigments, extenders) to give a cathodically depositable coating composition. Such a technique is known in the art. In any case, the coatings obtained with the coating compositions are cured by baking, whereby the blocked isocyanate compound is deblocked and reacts with the active hydrogen-containing compound to form a polyurethane. In cases where the blocked isocyanate compound serves at the same time as an active hydrogen-containing compound, the reaction which takes place on deblocking may be called crosslinking.

Greater amounts of the monoorganotin compounds make the polyurethane formation reaction proceed smoothly at lower temperatures. Generally, however, they are used in amounts of 0.05–5%, preferably 0.1–2%, by weight based on the active hydrogen-containing compound.

The use of the monoorganotin compounds in accordance with the present invention advantageously lowers the deblocking temperature, hence the baking temperature, and gives cured coatings with a smooth surface and good performance.

The following non-limitative reference examples and examples will further illustrate the present invention. "Part(s)" means "part(s) by weight".

REFERENCE EXAMPLE 1

A 500-ml four-necked flask equipped with a stirrer, a thermometer, a dropping funnel and a Liebig condenser is charged with 28.2 g (0.1 mole) of monobutyltin trichloride and 200 ml of deionized water. The contents are warmed to 20°–30° C., and 32 g of a 25% aqueous solution of sodium hydroxide (0.2 mole) is gradually added dropwise. White crystals precipitate out. After the addition, the mixture is stirred at 20°–30° C. for 2 hours. Then, 100 ml of hexane is added, followed by gradual dropwise addition at 20°–30° C. of a separately prepared reaction mixture of 14.4 g (0.1 mole) of 2-ethylhexanoic acid and 4 g (0.1 mole) of sodium hydroxide in 100 ml of water. Care should be taken during the dropping that the flask contents are not made alkaline. After the addition, the mixture is stirred for an hour. The hexane layer is separated and concentrated to give 30 g of monobutyltin mono(2-ethylhexanoate) as a white filmy substance.

Elemental analysis. Calculated for $C_{12}H_{24}O_3Sn$: C 43.02%, H 7.17%, Sn 35.46%;
Found: C 43.02%, H 7.32%, Sn 34.94%.

REFERENCE EXAMPLE 2

A 500-ml four-necked flask equipped with a stirrer, a thermometer and a Dean-Stark trap is charged with 50 g (0.24 mole) of monobutyltin oxide, 34.5 g (0.24 mole) of monoethyl maleate and 150 ml of toluene. The contents are heated under reflux. After about 4 ml of water is separated, the toluene is distilled off to give 79 g of monobutyltin ethyl maleate as a latex-like substance ($C_4H_9Sn(O)OCOCH=CHCOOC_2H_5$).

Elemental analysis. Calculated for $C_{10}H_{16}O_5Sn$: C 35.85%, H 4.78%, Sn 35.46%;
Found: C 35.71%, H 4.80%, Sn 35.13%.

REFERENCE EXAMPLE 3

A 500-ml four-necked flask equipped with a thermometer, a dropping funnel, a stirrer and a Dimroth condenser is charged with 36 g (0.15 mole) of sodium sulfide nonahydrate and 115 ml of water. After dissolution of the sulfide, a solution of 28.2 g (0.1 mole) of monobutyltin trichloride in 150 ml of water is added dropwise with stirring. After the addition, the mixture is stirred at 60° C. for 30 minutes. After cooling, the precipitate is filtered off, washed with water and dried to give 22.8 g of a white powder. Analyses indicate that this powder is monobutyltin sulfide.

The following compounds are prepared in the same manner:
Monomethyltin sulfide, a white powder;
Monoethyltin sulfide, a white powder; and
Monooctyltin sulfide, a white powder.

EXAMPLE 1

A four-necked flask equipped with a stirrer, an inlet tube for nitrogen and a thermometer is charged with 146 parts of adipic acid, 41 parts of ethylene glycol and 89 parts of trimethylolpropane. The contents are gradually heated under nitrogen. At 100° C., dissolution takes place. As the temperature is further raised gradually with stirring, water begins to be distilled off. While water formed is expelled from the reaction system, heating is continued at 150° C. for 2 hours, then at 190° C. for 3 hours, and further at 190° C. under reduced pressure (200 mm Hg) for an hour. The resulting polyester polyol is dissolved in ethyl acetate, to prepare a 50% solution. In 20 parts of this solution are dissolved 17 parts of a 70% solution of a perfectly blocked isocyanate compound in 2-methoxyethanol, and 20 parts of toluene. (The perfectly blocked isocyanate compound is prepared from tolylene diisocyanate (80% 2,4-isomer and 20% 2,6-isomer) and 2-ethylhexanol.) To 100 parts of the resulting solution is added 0.1 part of a monoorganotin catalyst (Table 1). The resulting composition is applied to degreased steel sheets with a doctor blade, and the coatings are baked in an electric oven at various temperatures for 30 minutes. The degrees of curing are as shown in Table 1, wherein the symbol − means that the coating is still in an uncured state as indicated by the fact that, when fingered, the coating adheres to the finger; the symbol ± means that the coating has been cured to a certain extent but, when fingered, gives a fingerprint; and the symbol + indicates a state of complete curing.

TABLE 1

| Tin compound | Baking temperature (°C.) | | | | | | |
|---|---|---|---|---|---|---|---|
| | 120 | 140 | 150 | 160 | 170 | 180 | 200 |
| The Invention | | | | | | | |
| Monobutyltin oxide | ± | + | | + | | + | |
| Monooctyltin oxide | − | ± | | + | | + | |
| Monophenyltin oxide | − | ± | | + | | + | |
| Monobutyltin monoacetate | | − | + | + | + | + | |

TABLE 1-continued

| Tin compound | Baking temperature (°C.) | | | | | | |
|---|---|---|---|---|---|---|---|
| | 120 | 140 | 150 | 160 | 170 | 180 | 200 |
| Monobutyltin mono(2-ethylhexanoate) | | − | + | + | + | + | |
| Monobutyltin ethyl maleate | | − | + | + | + | + | |
| Monobutyltin monolaurate | | − | ± | + | + | + | |
| Monooctyltin mono(2-ethylhexanoate) | | − | ± | + | + | + | |
| For comparison | | | | | | | |
| Dibutyltin oxide | | − | − | − | + | + | |
| Dibutyltin dilaurate | − | − | − | − | − | + | |
| Tetrabutyl-1,3-diacetoxy-distannoxane | | − | − | − | ± | ± | + |
| No catalyst (control) | − | − | − | − | − | − | + |

EXAMPLE 2

The procedure of Example 1 is followed, except that 0.1 part of a mixture of monobutyltin oxide on one hand and dibutyltin oxide, dibutyltin dilaurate or tetrabutyl-1,3-diacetoxydistannoxane on the other is used as the catalyst. The results are as shown in Table 2.

TABLE 2

| Weight ratio in the catalyst | | | | Baking temperature (°C.) | | | | |
|---|---|---|---|---|---|---|---|---|
| Monobutyltin oxide | Dibutyltin dilaurate | Tetrabutyl-1,3-diacetoxy-distannoxane | Dibutyltin oxide | 140 | 160 | 170 | 180 | 200 |
| 1 | 9 | 0 | 0 | − | − | + | + | |
| 3 | 7 | 0 | 0 | − | + | + | + | |
| 1 | 0 | 9 | 0 | − | − | + | + | |
| 3 | 0 | 7 | 0 | − | ± | + | + | |
| 1 | 0 | 0 | 9 | − | + | + | + | |
| 2 | 0 | 0 | 8 | − | + | + | + | |
| 3 | 0 | 0 | 7 | − | + | + | + | |
| For comparison: | | | | | | | | |
| 0 | 10 | 0 | 0 | − | − | − | + | |
| 0 | 0 | 10 | 0 | − | ± | ± | + | |
| 0 | 0 | 0 | 10 | − | − | + | + | |
| No catalyst | | | | − | − | − | − | + |

The symbols −, ± and + are as defined in Example 1.

EXAMPLE 3

A mixture is prepared by blending 100 parts of Desmophen 1100 (Bayer's polyester polyol), 143 parts of a 70% solution of a perfectly blocked isocyanate compound (prepared from 2,4-tolylene diisocyanate and 2-ethylhexanol in a molar ratio of 1:2) in methoxyethanol, 100 parts of toluene and 100 parts of methoxyethanol. In 100 parts of this mixture is dissolved 0.1 part of a monoalkyltin sulfide specified in Table 3, the resulting composition is applied to degreased steel sheets, and the coatings are baked in an electric oven for 30 minutes. The results are shown in Table 3.

TABLE 3

| Tin compound | Baking temperature (°C.) | | | | | |
|---|---|---|---|---|---|---|
| | 140 | 150 | 160 | 170 | 180 | 200 |
| The invention | | | | | | |
| Monomethyltin sulfide | − | + | + | + | + | |
| Monoethyltin sulfide | − | + | + | + | + | |
| Monobutyltin sulfide | − | + | + | + | + | |
| Monooctyltin sulfide | − | ± | + | + | + | |
| For comparison | | | | | | |
| Dibutyltin oxide | − | − | − | ± | + | |
| Dibutyltin dilaurate | − | − | − | − | + | |
| Tetrabutyl-1,3-diacetoxy-distannoxane | − | − | ± | + | + | |
| No catalyst | − | − | − | − | − | + |

The symbols −, ± and + are as defined in Example 1.

EXAMPLE 4

(a) 2-Ethoxyethanol (90 parts) is added dropwise at 60° C. over 2 hours with stirring to 174 parts of tolylene diisocyanate (TDI) (80% 2,4-isomer and 20% 2,6-isomer) under nitrogen. After completion of the addition, the mixture is stirred at 60° C. for 2 hours, to give a half-blocked TDI.

(b) A mixture of 500 parts of EPON 1001 epoxy resin (a condensation product of epichlorohydrin and bisphenol A, having an epoxy equivalent of 500, available from Shell Chemical Co.) and 100 parts of toluene is heated to 80°–100° C. to complete dissolution. Then, 73 parts of diethylamine is added dropwise at 80°–100° C. with stirring. After the addition, the mixture is heated at 120° C. for 2 hours with stirring. Thereafter, 280 parts of a fatty acid mixture derived from dehydrated castor oil is added. The mixture is heated under reflux at 200° C. for 5 hours with a Dean-Stark trap used for removing water formed. The toluene is then distilled off under reduced pressure. After cooling to 100° C., 300 parts of butyl acetate is added. While stirring at 100° C., 264 parts of the half-blocked TDI prepared in (a) above is added dropwise at 100° C. over 1–1.5 hours. After the addition, the mixture is heated at 120° C. for 2 hours with stirring. After cooling to 50°–60° C., 60 parts of acetic acid and 1,550 parts of deionized water are added with stirring. There is thus obtained a 37% base emulsion for preparing a coating composition.

(c) An electrodepositable coating composition is prepared by mixing 100 parts of the 37% base emulsion prepared in (b) above, 6 parts of red iron oxide, 6 parts of titanium white and 0.5 part of monobutyltin oxide in a ball mill for several hours and then adding 264 parts of deionized water. The composition has a solid content of 13% and a pH of 5.5–6.

(d) The coating composition prepared in (c) above is electrodeposited on a degreased steel sheet (5×12×0.1 cm) as a cathode at a voltage of 50–150 V for a minute, with a carbon rod used as an anode. The coated sheet is rinsed with deionized water, predried at 60°–80° C. for 10 minutes and baked in an electric oven at 160° C. for 20 minutes. A smooth, tough coating is obtained.

In a cross-cut test of a coating obtained in this manner, none of 100 sections (each 1×1 mm) were peeled off. In an impact resistance test, the coating was not damaged by an impact of 500 g×50 cm.

In a control run where 0.5 part of dibutyltin oxide was used in place of monobutyltin oxide, the coating was not completely cured even by baking at 170° C. for 20 minutes, as indicated by dissolution on rubbing with an acetone-impregnated gauze and by a distinct fingerprint left after fingering.

What is claimed is:

1. In a method of producing polyurethanes by reacting an at least partially blocked isocyanate compound with an active hydrogen-containing compound under heating in the presence of an organotin catalyst, the improvement which comprises using as the organotin catalyst a monoorganotin compound selected from the group consisting of a mono-$C_{1-8}$-alkyltin oxide, a mono-$C_{1-8}$-alkyltin monocarboxylate, a mono-$C_{1-8}$-alkyltin sulfide and monophenyltin oxide.

2. A method according to claim 1, wherein the monoorganotin compound is a mono-$C_{1-8}$-alkyltin oxide or monophenyltin oxide.

3. A method according to claim 2, wherein the mono-$C_{1-8}$-alkyltin compound is selected from the group consisting of monobutyltin oxide and monooctyltin oxide.

4. A method according to claim 3, wherein the mono-$C_{1-8}$-alkyltin oxide is monobutyltin oxide.

5. A method according to claim 3, wherein monobutyltin oxide is used in combination with dibutyltin dilaurate, tetrabutyl-1,3-diacetoxydistannoxane or dibutyltin oxide.

6. A method according to claim 1, wherein the monoorganotin compound is a mono-$C_{1-8}$-alkyltin monocarboxylate selected from the group consisting of monobutyltin monoacetate, monobutyltin mono(2-ethylhexanoate), monobutyltin ethyl maleate, monobutyltin monolaurate and monooctyltin mono(2-ethylhexanoate).

7. A method according to claim 1, wherein the monoorganotin compound is a mono-$C_{1-8}$-alkyltin sulfide selected from the group consisting of monomethyltin sulfide, monoethyltin sulfide, monobutyltin sulide and monooctyltin sulfide.

* * * * *